(12) United States Patent
Wayman

(10) Patent No.: US 11,802,633 B2
(45) Date of Patent: Oct. 31, 2023

(54) APPARATUS AND METHOD FOR DETECTION AND MONITORING OF THE CONDITION OF PIPELINE COMPONENTS

(71) Applicant: Advanced Engineering Solutions Limited, Cramlington (GB)

(72) Inventor: Malcolm Wayman, Cramlington (GB)

(73) Assignee: Advanced Engeering Solutions Ltd, Cramlington (GB)

( * ) Notice: Subject to any disclaimer, the term of this patent is extended or adjusted under 35 U.S.C. 154(b) by 40 days.

(21) Appl. No.: 15/562,206

(22) PCT Filed: Mar. 29, 2016

(86) PCT No.: PCT/GB2016/050875
§ 371 (c)(1),
(2) Date: Sep. 27, 2017

(87) PCT Pub. No.: WO2016/156829
PCT Pub. Date: Oct. 6, 2016

(65) Prior Publication Data
US 2018/0119844 A1    May 3, 2018

(30) Foreign Application Priority Data

Mar. 27, 2015 (GB) ..................................... 1505282
Apr. 16, 2015 (GB) ..................................... 1506443

(51) Int. Cl.
*F16K 37/00* (2006.01)
*G01M 3/24* (2006.01)
(Continued)

(52) U.S. Cl.
CPC .......... *F16K 37/0083* (2013.01); *E03B 7/075* (2013.01); *F17D 5/06* (2013.01);
(Continued)

(58) Field of Classification Search
CPC ...... G01M 3/243; G01M 3/24; G01N 29/024; G01N 29/14; G01N 2291/0258;
(Continued)

(56) References Cited

U.S. PATENT DOCUMENTS

| | | | | |
|---|---|---|---|---|
| 6,289,723 B1* | 9/2001 | Leon | ....................... | G01M 3/24 73/40.5 A |
| 9,151,022 B2* | 10/2015 | Patel | ....................... | E03B 7/071 |
| 2001/0045129 A1* | 11/2001 | Williams | ................ | G01M 3/24 73/592 |
| 2003/0167847 A1 | 9/2003 | Brown et al. | | |

(Continued)

FOREIGN PATENT DOCUMENTS

| | | |
|---|---|---|
| DE | 4207067 A1 | 9/1993 |
| EP | 2423429 A1 | 2/2012 |

(Continued)

OTHER PUBLICATIONS

Jonas Berge, "Cut Your Losses with Relief Valve Monitoring", Inside Process, Control Engineering Asia, Jan.-Feb. 2015, p. 28-29.

*Primary Examiner* — Daniel S Larkin
*Assistant Examiner* — Nashmiya S Fayyaz
(74) *Attorney, Agent, or Firm* — GableGotwals

(57) ABSTRACT

This invention relates to apparatus for the monitoring of the condition of a pipeline (8) which is provided to carry a liquid therealong and/or a component (4) fitted to and operable in communication with the pipeline. The apparatus including at least one detecting device fitted on, or adjacent to, the component (4) to detect a change in condition of the component (4) and/or pipeline (8).

26 Claims, 8 Drawing Sheets

(51) Int. Cl.
  *F17D 5/06* (2006.01)
  *G01N 29/024* (2006.01)
  *E03B 7/07* (2006.01)
  *G01N 29/14* (2006.01)
  *G01F 1/66* (2022.01)

(52) U.S. Cl.
  CPC ............. *G01F 1/666* (2013.01); *G01M 3/243* (2013.01); *G01N 29/024* (2013.01); *G01N 29/14* (2013.01); *F16L 2201/30* (2013.01); *G01N 2291/0258* (2013.01); *G01N 2291/2634* (2013.01)

(58) Field of Classification Search
  CPC ......... G01N 2291/2634; F16L 2201/30; F16K 37/0083; F03B 7/075; F17D 5/06; G01F 1/666
  USPC ....................................... 73/592, 40.5 A, 587
  See application file for complete search history.

(56) References Cited

U.S. PATENT DOCUMENTS

| | | |
|---|---|---|
| 2005/0257618 A1 | 11/2005 | Boken |
| 2006/0124171 A1* | 6/2006 | Ghazarian ................. F17D 5/06 137/312 |
| 2006/0174707 A1* | 8/2006 | Zhang ................... G01N 29/222 700/282 |
| 2014/0182381 A1* | 7/2014 | Comeaux ............... G01N 29/12 73/587 |
| 2014/0217315 A1* | 8/2014 | Morozumi .......... F16K 27/0236 251/30.05 |
| 2015/0052979 A1 | 2/2015 | Cho et al. |
| 2016/0208952 A1* | 7/2016 | Howitt ................ F16K 37/0075 |

FOREIGN PATENT DOCUMENTS

| | | | |
|---|---|---|---|
| WO | 2012153147 A1 | 11/2012 | |
| WO | WO-2012164240 A2 * | 12/2012 | ......... F16K 37/0041 |
| WO | 2013025526 A1 | 2/2013 | |
| WO | 2014115039 A2 | 7/2014 | |
| WO | 2015031180 A1 | 3/2015 | |

\* cited by examiner

------ - District Meter Zone boundary

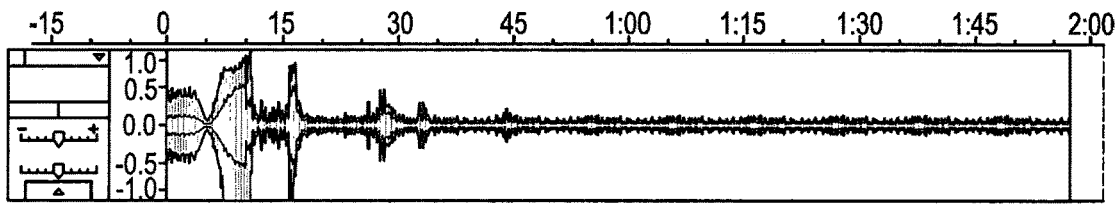

Fig. 10  TYPICAL ACOUSTIC PROFILE OF AV VENTING

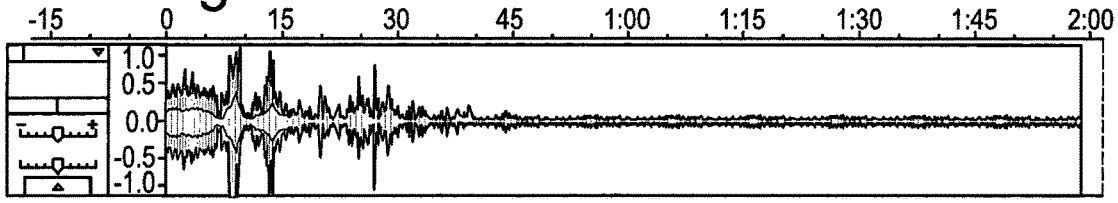

Fig. 11  NON-TYPICAL ACOUSTIC PROFILE OF AV VENTING

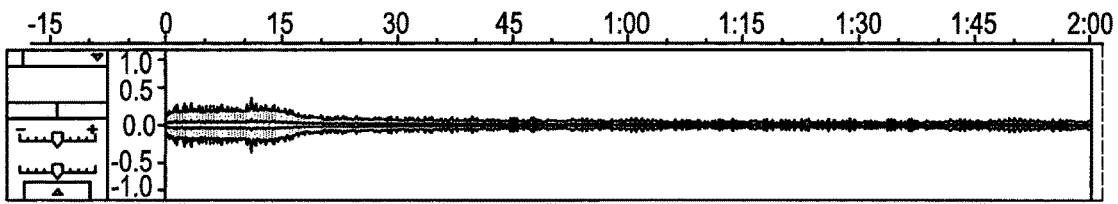

Fig. 12  TYPICAL ACOUSTIC PROFILE OF A AV VENTING AT MIDDLE ONE ROW SITE

| TABLE1: COMPLETE LOG FILE GENERATED FROM TESTING |||| 
| FILENAME | TIME | DATE | COMMENT |
| A0000069.RAW | 07:52 | 29/01/2016 | void-Start of initial test |
| A0000070.RAW | 07:54 | 29/01/2016 | void-Attaching second AVM to AV |
| A0000071.RAW | 07:58 | 29/01/2016 | |
| A0000072.RAW | 08:05 | 29/01/2016 | |
| A0000073.RAW | 08:18 | 29/01/2016 | |
| A0000074.RAW | 08:31 | 29/01/2016 | |
| A0000075.RAW | 08:43 | 29/01/2016 | |
| A0000076.RAW | 08:55 | 29/01/2016 | |
| A0000077.RAW | 09:07 | 29/01/2016 | void Blank recording #1 |
| A0000078.RAW | 09:21 | 29/01/2016 | |
| A0000079.RAW | 09:35 | 29/01/2016 | |
| A0000080.RAW | 09:49 | 29/01/2016 | |
| A0000081.RAW | 10:03 | 29/01/2016 | |
| A0000082.RAW | 10:18 | 29/01/2016 | |
| A0000083.RAW | 10:34 | 29/01/2016 | |
| A0000084.RAW | 10:48 | 29/01/2016 | |
| A0000085.RAW | 11:03 | 29/01/2016 | |
| A0000086.RAW | 11:18 | 29/01/2016 | |
| A0000087.RAW | 11:33 | 29/01/2016 | |
| A0000088.RAW | 11:49 | 29/01/2016 | |
| A0000089.RAW | 12:06 | 29/01/2016 | |

Fig. 13

APPARATUS AND METHOD FOR DETECTION AND MONITORING OF THE CONDITION OF PIPELINE COMPONENTS

CROSS-REFERENCE TO RELATED APPLICATIONS

This application is the United States National Phase of Patent Application No. PCT/GB2016/050875 filed 29 Mar. 2016, which claims priority to British Patent Applications Nos. 1505282.2 filed 27 Mar. 2015 and 1506443.9 filed 16 Apr. 2105 each of which are incorporated herein by reference.

BACKGROUND OF THE INVENTION

The invention to which this application relates is to the monitoring and/or detection of the condition of one or more components which are fitted to, and provided to be used with, a pipeline. In particular, although not necessarily exclusively, the pipeline is for use for the passage of liquids therealong.

The provision of pipelines to carry liquids such as water or effluents is well known and typically, once laid, the pipeline will be in service for many years and is typically located underground. The pipeline, in many cases, is provided with one or more components at locations therealong, such as valves which are fitted on the pipeline at locations where it is believed that the air or gas is likely to collect within the pipeline. The provision of the valves is to allow the same to be operated in order to allow controlled air entry into or gas and/or air removal from the pipeline in order to maintain the flow rate of the liquid being transported and to prevent high dynamic pressure loading, including positive and negative pressures, within the pipeline and which, if uncontrolled, could cause damage and/or failure of the pipeline.

Conventionally, two types of valve can be selectively used, the first being a type which allows the escape of air or gas from the pipeline and the second being a type which also allows air to enter the pipeline. Some designs of these valves allow the controlled escape or ingress of small and large flows of gas or air. These valves are provided to be in communication with the pipeline at all times and to contain a quantity of the pipeline liquid therein. If the liquid level in the valve changes then this is indicative of a change of the condition in the pipeline which may require the valve to operate to allow the movement of air/gas therethrough. If the valve is operating correctly the change in the level of the liquid in the valve should change the level of a float which, in turn should open the valve to allow the passage of air or gas therethrough. The valves are provided for independent operation, the emission of gas or air being initiated by its presence in the pipeline and valve body, and the ingress of air being caused by the valve mechanism monitoring for negative pressure in the pipeline. The ability for these valve components to be available to be operational independently is important as the valves can often be located at relatively remote and/or inaccessible areas such that operation by a person would be difficult to achieve quickly and would be a time consuming task, even if the person was aware that there was a problem.

The operation of the valves is critical to the ongoing life and use of pipelines carrying the liquids as, if the valves are inoperable or faulty when required to be used, operating efficiency can reduce and excessive peak dynamic positive or negative pressures can be created within the pipeline and the pipeline operator has no way by which to mitigate these problems. The problems can be such that the trapping of the air or gas, typically air in water pipelines and gas in sewer pipelines, can, due to high dynamic pressures, initiate fractures and provide energy to allow these fractures to propagate over long distances. Furthermore, the negative pressures can dislodge seals from mechanical pipe joints and will increase the total of the 'crushing' load on the pipeline.

The risk of failure of the pipeline is as a result of the interaction between moving columns of water or effluent and air or gas pockets in the pipeline which can result in surge pressures well above the levels defined as being acceptable in the pipeline standards. Other pipeline equipment, for example reflux valves, can also result in pipeline surge pressures being above allowed limits.

There are a number of major sources of air in water pipelines and gas in sewer pipelines and these can be: any or any combination of, the fact that water contains around 2% to 3% air by volume, some of which can be released under normal operating conditions. Effluent can produce and contain, a much higher percentage of gas and/or during pipeline commissioning or repair, air that is not displaced by the incoming water, gravitates to pipeline high spots and/or air can be drawn into the pipeline by pumping operations, for example during the periodic pumping cycles used to evacuate rising main wet wells.

To put into perspective the potential adverse effect, if 1% of the air or gas contained in a 10 km length of pipeline was released from the water or effluent, and concentrated at one location, it would fill a 100 m long pipeline section. Air or gas is considered to move slowly through a pipeline and one potential reason being that due to its lower density, on downward sections, the air or gas will move against the liquid flow.

With regard to pipeline networks which are pumped liquid mains supply networks, the ability to monitor and record the history of air release potentially provides information which is useful for the analysis of pumping cycle issues and optimisation of operation.

The presence of air or gas pockets in a pipeline can influence the pipeline performance in several ways. For example, if they dislodge suddenly and move to another pipeline high point, rapid fluid velocity changes and large surge transients can result. In pipelines in which the liquid is pumped along the same, division of water or effluent columns either side of pipeline high spots, when the pumping stops, can cause vacuum pressures to be created. This means that upon the pump restart, the forward flow of water or effluent columns can cause surge pressures in trapped air or gas pockets. In terms of analysing pipeline performance capability, it is suggested that peak pressures of up to 15 times the pipeline operating pressure can be generated in such air pockets. The provision of these air pockets can also cause head loss and increased energy consumption. Studies from a number of international water systems, estimate efficiency drops of up to 30% resulting from trapped air, and that in most water systems flow efficiencies are reduced by 15 to 20%. This would result in a 15 to 20% increase in electrical power usage by pumps. Eventually, if the pipeline dynamics prevent the trapped air from moving downstream, then the flow reduction could result in a pressure drop higher than pump capacity.

Examples are known of pipeline failures occurring close to air valve positions and investigations have found that these valves are not operational, suggesting that trapped pocket of air or gas contributed to the failures with the pressurised air pockets increasing the likelihood of fracture initiation and providing the necessary energy for a crack to propagate along the pipeline.

In practice, it is found that these valve components will be required to operate at different and unknown times and at least some, typically, may not be required to operate for relatively long periods of time and/or have no regular operating pattern. This means that it is difficult at present to be able to establish that the valves are available for operation at any given time, especially when one considers that they are typically located underground and are relatively inaccessible.

The air valves are conventionally installed where air or gas pockets can collect along the pipeline, that is at high points and gradient changes. However as it is known that air valves are often not maintained, it is generally not known how much, and where, air or effluent gases actually accumulate. Thus, whilst it is probable that pipelines may be fitted with more air valves than are really required, the performance of some air valves will be more important than others. In addition, as pipelines deteriorate, the importance of these air valves to pipeline integrity is likely to increase.

Conventionally the problem has been addressed by a person visiting the valve components locations periodically to check that the valve components are operating correctly. However, as the valves are normally installed in a buried chamber which is sealed by a lid, this lid is required to be removed to gain visual and physical access to the valve components to check the same. This access can be difficult to achieve in that the weight of the lid may require two persons with appropriate lifting equipment to lift the same. Furthermore, access can also be difficult because of the location of the valve chambers in roads or footpaths, private land, etc., such that it will be readily appreciated that the current checking procedure is time consuming, requires significant manpower to be used and is therefore expensive to perform over the many miles of pipeline on which the valve components are required to be checked. Furthermore, the valve designs generally require at least a partial strip down to confirm operability.

Furthermore, as the need to confirm air valve operation has conventionally not been recognised until pipeline deterioration and failures occur, the operation checks are often not performed at all, or are not performed sufficiently frequently.

Further problems can be experienced in other forms of pipeline which are again caused by a lack of operation of components which are fitted. These pipelines include for example, the valve used in water distribution supply networks which are divided into District Meter Areas (DMA's), and in this case there is a need to account for and control consumption across the water distribution network.

Each DMA is intended to be isolated from adjacent DMA's by the provision of valves on the water supply pipelines at the boundaries between adjacent DMA's and the water which is input into each DMA is independently metered and usage from the individual DMA's is measured. In the cases where the customer has a meter the actual water usage is measured and where the customer does not have a meter an estimate of their water usage is reached as a result of analysis of the customer "type". This, in conjunction with the monitoring of the water supplied and water usage in each DMA allows a reasonably accurate estimation of unaccounted water quantities in each DMA to be achieved. For this water supply process to be more accurate, all the water which is input into the particular DMA has to be metered, and all of the valves isolating adjacent DMA's must therefore remain tightly closed. However, the ability to ensure unmetered water does not enter a particular DMA is operationally problematic to achieve for a number of reasons which include, for example, the fact that as valves deteriorate they may begin to allow water to pass therethrough and/or the valves can be opened for periods of time in order to maintain supplies across different DMA's for operational reasons, and/or the valves may not be fully closed afterwards and/or valves may be opened in error when intended to be closed due to differences in the required direction of rotation to close or open valves, (which can vary between valves fitted to the same pipeline).

If a DMA isolation valve is partially or fully open, then water will pass through the same when there is sufficient difference in the water pressure in adjacent DMA's. The DMA's are supplied with water through pressure reducing valves (PRV's) which control the maximum pressure and ensure sufficient water is available and this is the inward water which is metered. Thus, the actual pressure difference between adjacent DMA's is likely at times to be similar, and at other times to vary. The time at which the greatest pressure difference between adjacent DMA's exists is accepted as being during the night and, more specifically, between 2 am and 4 am. The demand on the systems also lowers at this time and hence the "noise" on the pipeline which may be caused by other system noises is reduced.

At present, there is no known method of automatically monitoring the operation of the DMA isolation valves and it is difficult operationally to check the status of isolation valves. This can be due to the variations in times and locations when the conditions, such as the pressure difference between adjacent zones, would result in water flowing through open or partially open valves. The optimum times for checking isolation valves are also outside of day working hours. Furthermore, the location of these valves in chambers which may be in, or adjacent to, busy roads, or at remote sites etc. can also make physical checking of the valves expensive.

The aim of the present invention is to provide apparatus which allows the checking of one or more components fitted to a pipeline which carries liquid to be performed and data to be provided which is indicative of the component condition and thereby avoid the need for a physical check to be performed by accessing the valve at the location of the component.

In a first aspect of the invention there is provided apparatus for the monitoring of the condition of a pipeline which is provided to carry a liquid therealong and/or a component fitted to and operable in communication with said pipeline, said apparatus including at least one detecting device fitted on, or adjacent to, the said component in order to detect a change in condition of the component and/or pipeline.

Typically the component is a valve and the change in condition of the valve is achieved by the mechanical operation of the valve, such as between and open and closed condition.

In one embodiment the change in condition is indicated by the detection of the flow of the liquid, air and/or gas in the pipeline.

In one embodiment the device is a device which detects vibration and/or is a listening device which detects the sound of the liquid, air or gas movement through the valve, typically in order to leave or enter the pipeline, via the said component.

In one embodiment the apparatus includes a memory means for the storage of data indicative of the change and/or no change of condition with respect to time.

In one embodiment the storage of the data is performed at the location of the apparatus and then retrieved, typically remotely, and assessed to determine the operation, or otherwise of the component.

In one embodiment if a change in condition is not detected within a given time period then an alert signal is transmitted to a monitoring location and/or an alert is generated at the location of the apparatus.

Typically the storage of the data allows the operation of the valve component to be monitored and confirmed.

In one embodiment the vibration and/or sound which is detected is mechanical noise resulting from operation of the internal mechanism of the component. In one embodiment, this detection can be used alone or in conjunction with the detection of the passage of air, gas or liquid to determine whether, while the component may be operating, the level of performance or efficiency of the component is acceptable.

In one embodiment the detecting device for monitoring sound is a microphone, also known as a Hydraphone, placed externally on the component and is retained in position with respect thereto. In one embodiment the retention is achieved using a magnetic pad which connects the microphone to the component or pipeline.

In one embodiment the detecting device is located in a container which allows protection of the same from the external environment, and is typically waterproof. In one embodiment the container also includes therein processing means which collect, and/or process and/or store the data, and/or data communication means, such as wireless communication means, to allow the collected and/or stored data to be transmitted to a remote location.

Typically the fact that the components are typically already located within an underground chamber means that noise from external sources such as road traffic, rail traffic and generally above ground noise, is reduced or eliminated.

In one embodiment the device is provided in conjunction with the component to be monitored for a period of time, such as a number of days, and the data received from the device is stored on a storage media such as a removable storage card. The storage media can then be subsequently analysed to ascertain whether sound data indicative of the correct operation of the component has been detected or not.

In a further embodiment the apparatus is provided in conjunction with the component or pipeline on a permanent basis and the data generated is transmitted continuously or periodically to processing means for analysis so as to provide an indication of ongoing changes in condition of the component and/or pipeline. In one embodiment the processing means are located remotely from the device.

In one embodiment the change in condition which is detected by the apparatus in accordance with the invention is a change in condition in the pipeline in the form of a leak of liquid therefrom and the noise or vibration caused by the leak is detected by the apparatus. Typically the apparatus and/or the subsequent analysis of the data received, can identify the predetermined noise and/or vibration which is expected to be caused by a leakage and compare that with the data which is received to identify whether the same is caused by leakage or by operation of the valve component.

Typically the apparatus and the analysis of the data therefrom can be used to compare a noise pattern from data received from the apparatus with a noise pattern which would be expected to be generated by the operation of the valve component and from that comparison a decision made as to whether or not the detected noise is indicative of a change in condition of the valve.

In one embodiment the apparatus is provided in direct contact with the liquid in the pipeline rather than being mounted on the valve component.

In one embodiment the analysis of the detected change in condition pattern is performed automatically with the appropriate detected change in condition data and periods between the component operation identified by analysis (eg. Fourier transforms) on site or after data transfer.

In one embodiment Bluetooth and/or mobile phone technology is used, as appropriate, to transfer recorded data to an operator within a given range, which range may in one embodiment be sufficient to allow the operator to receive the data without needing to gain access to a chamber in which the device and component is located.

In one embodiment the communication means is provided so as to allow data to be transmitted to a remote monitoring location which may be located many miles from the location of the each of the valve monitoring devices.

In one embodiment the apparatus can be provided to operate as a default, in a dormant mode and, upon detection of a change in condition the apparatus is moved to an active mode.

In one embodiment when in the dormant mode the apparatus is provided to detect vibration and when in the active mode the apparatus is provided to detect vibration and/or sound.

Typically the vibration is taken to be representative of the start of a detected change in condition.

In a preferred embodiment the apparatus is provided to detect vibration when in a dormant mode and then to detect acoustic or sound when in the active mode. After a predetermined period of time during which no sound and/or vibration is detected, the apparatus returns to the dormant mode.

When in active mode the device transmits or stores data relating to the detected vibration and/or sound and then deactivates after a period of time, thereby allowing conservation of battery power which is typically required to operate the device.

In one embodiment, if the device is not activated within a given time period then this is taken to indicate non operation of the valve component, or possibly the device, and therefore necessitates a visit by an operator to the location of the non active device and/or valve component.

In one embodiment the apparatus is used to detect the operation of a component in the form of a valve which is normally provided in a closed position but, when open, allows the passage of air or gas therethrough.

The invention therefore allows confirmation that the component is or is not operating, recognising their intermittent operation, by the collected emitted noise and/or vibration from the air/gas movement.

In one embodiment, in addition or alternatively, the device in the form of a microphone can be used, when installed externally or in the chamber in which the valve is located, in identifying leakage from the pipeline which is local to, but not associated with, the operation of the valve. In this case the data representing leak noise from microphones fitted on adjacent components can be compared using correlator technology to determine whether the detected noise or vibration is representative of leakage.

In this embodiment, to correlate the detected noise or vibration of pipeline leakage from microphones or vibration detectors fitted at adjacent air valves, it may be necessary to install the detection means in contact with the water, rather than surface mounted microphones.

In one embodiment the apparatus is used in conjunction with isolation valves on appropriate DMA's to ensure factors such as unmetered water movement are detected and hence more accurate inward and outward water flows are identified and recorded.

In accordance with the invention the fitting of the apparatus to the DMA isolation valves significantly improves the accuracy of leakage measurements since open, or partially open, isolation valves are identified by the noise of the water passing through the valve, and, when detected by the apparatus, action can be taken to remediate the problem.

The apparatus is typically provided to be fitted in a chamber in which the component is fitted but external to the component.

In one embodiment the apparatus can be used in alternative ways to meet the short to long term DMA monitoring requirements, such as any or any combination of; a temporary installation of the apparatus with respect to an isolation valve for a period, perhaps several days, to identify any open or partially open isolation valves. The results from the temporary installation of acoustic monitors can then be downloaded using blue tooth technology, on-site, without having to access the valve chamber. An alternative arrangement is to provide the apparatus at a permanent installation with respect to a valve and to allow the apparatus to transfer data on detected valve failure, valve deterioration and/or on errors in valve operations directly back to a control room via mobile phone, Bluetooth and/or RF communication technology.

Typically the design of the detection device allows software based adjustment to meet alternative monitoring requirements:

In one embodiment the monitoring apparatus is provided to be dormant and switch into an operating mode upon the detection of the vibration or sound of water flowing through the valve.

In one embodiment, identified predefined noise or vibration patterns related to water flowing through the valve can be reported using blue tooth or mobile phone communications.

In one embodiment the valve noise or vibration recording time is adjustable from a few hours in any one period to full time over a lengthy period and the usage format which is selected can be used to determine the data storage and battery life requirements.

Typically data analysis can be performed by the monitoring apparatus in order to optimise data storage requirements. Storage on a memory card to allow physical removal of data records would allow further data analysis and provide inputs to failure investigations, and adjustments to be made for unaccounted water reports and the like.

In a further aspect of the invention there is provided apparatus for the monitoring of the condition of a component fitted to and operable in communication with a pipeline provided to carry a liquid therealong, said apparatus including at least one detecting device to detect a change in condition of the component by the detection of noise and/or vibration caused by the operation of the component.

Typically the apparatus is provided to operate in a dormant mode until a vibration or noise is detected whereupon the apparatus is moved to an active mode in which an acoustic device is operable to detect noise casued by operation of the component.

In one embodiment the component is an air valve.

Specific embodiments of the invention are now described; wherein

FIGS. 10-13 illustrate the data obtained from use of the apparatus in accordance with one embodiment of the invention.

Figure 1:
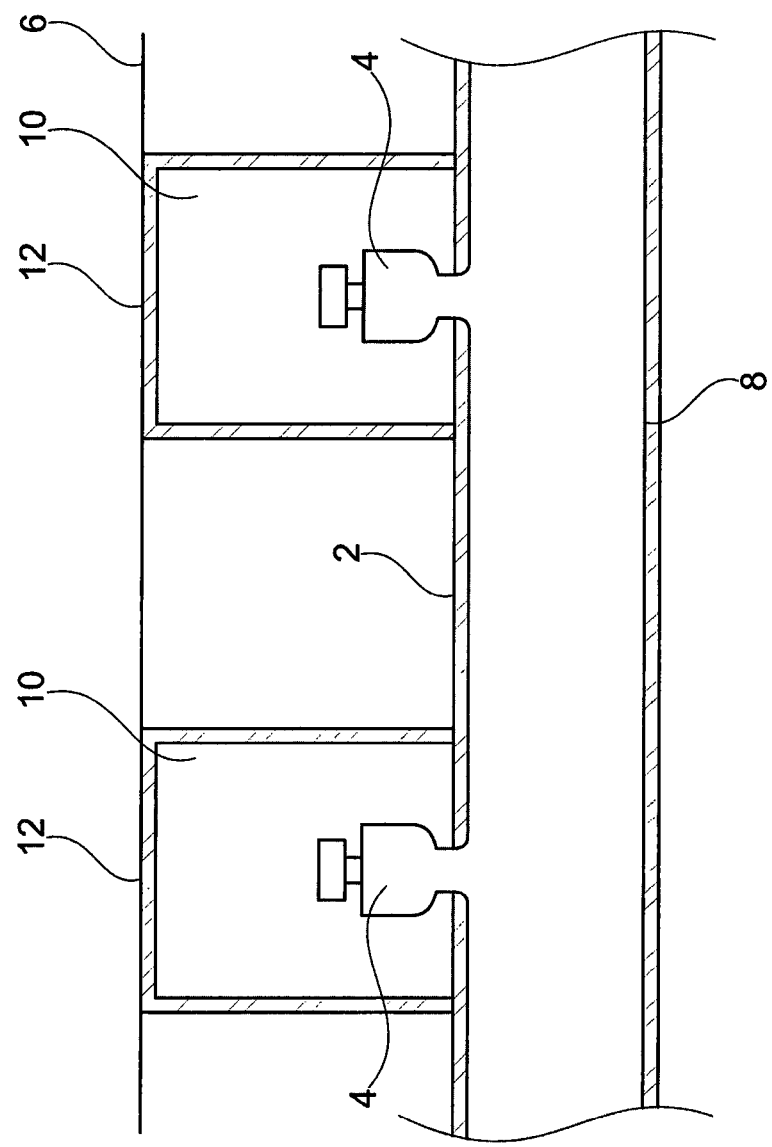
FIG. 1 illustrates a length of pipeline with components to be monitored in accordance with the invention.

A length of pipeline 2 is indicated in FIG. 1 and in cross section along its length. The pipeline is provided of a conventional form and is for use in allowing the passage of liquids such as water or effluent therealong. Conventionally, the pipeline is located under the surface 6 and has fitted thereto components in the form of valves 4. The valves are attached so as to pass through the pipeline wall and communicate with the interior of the pipeline 8 The valves are located at positions on the pipeline where the potentially damaging build-up of gas or air may occur within the pipeline. The valves are normally provided in a position which is closed to the external atmosphere but, on occasion, are required to be opened. Depending on the particular type of valve, when open, air or gas can be allowed to flow through the valve from the interior of the pipeline to the external environment to release air or gas pressure build up in the pipeline or to allow the passage of air or gas into the pipeline to overcome negative pressure occurring in the pipeline. The valves are typically located in a chamber 10 which is provided with a lid or cover 12 at the surface 6.

The requirement for the valves to open can occur sporadically and may only be required after relatively long periods of non-operation. However, when they are required to move to the open condition the need can be critical and therefore it is important that the valves operate to expel air from the pipeline or allow air into the pipeline as and when required. It is therefore important that the condition of the valves are monitored and this is achieved in the current invention as will now be described.

Figure 2:
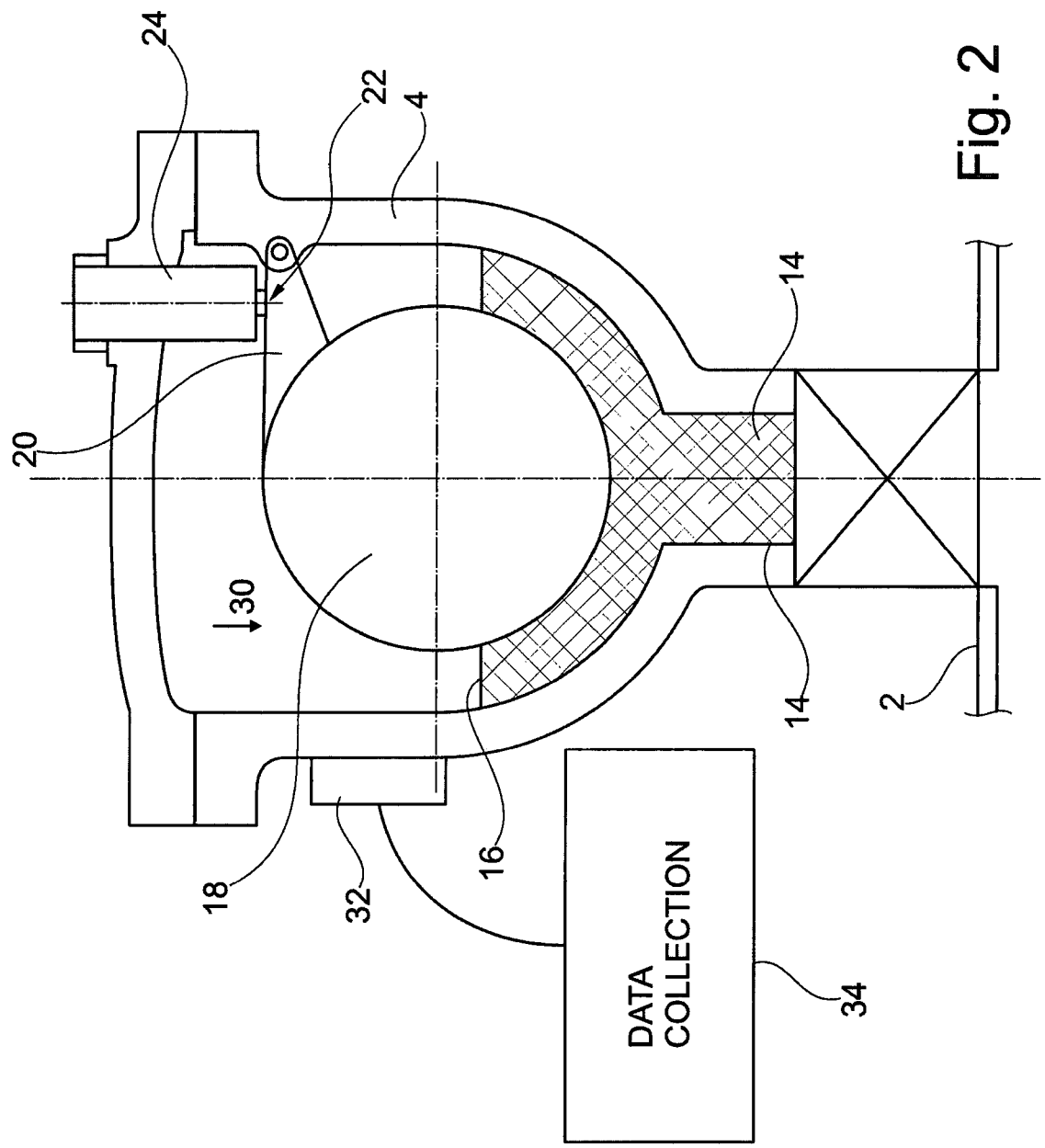
FIG. 2 illustrates an embodiment of a component with a device fitted in accordance with one embodiment of the invention.
Figure 3:
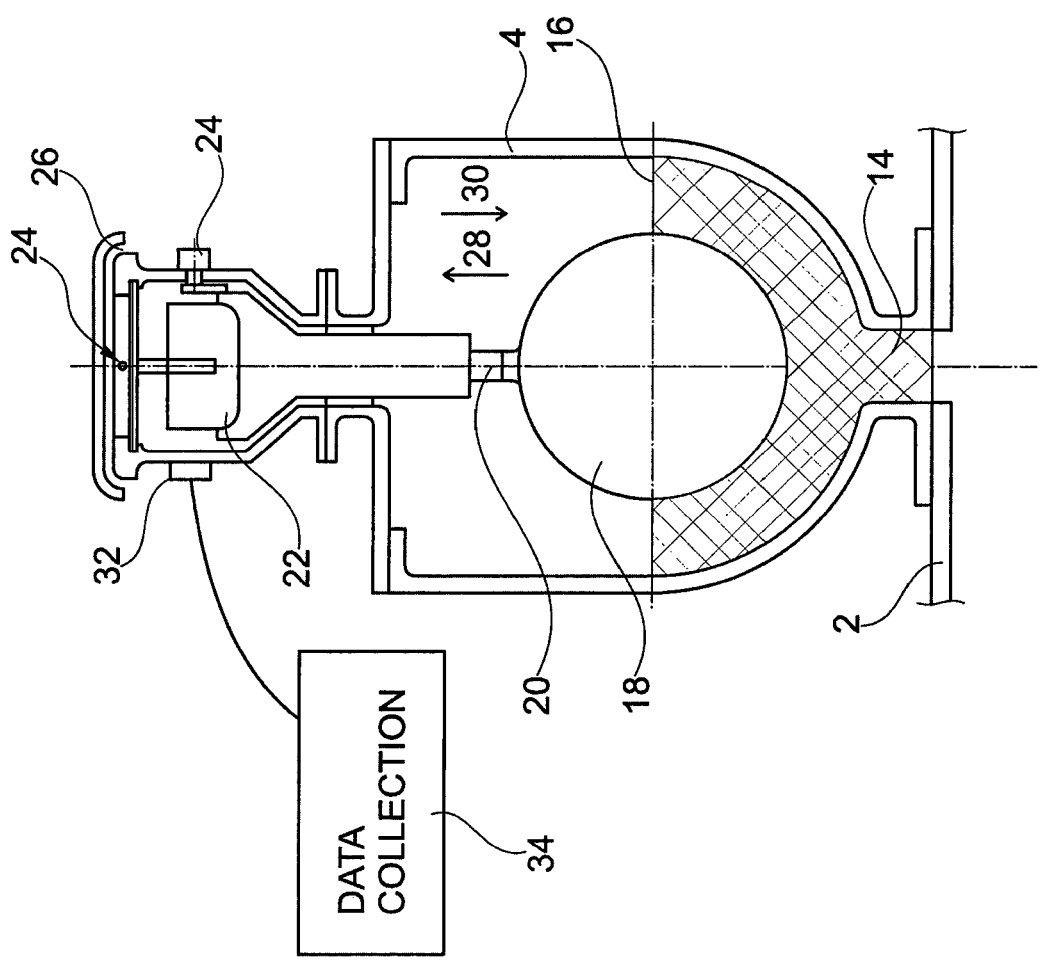
FIG. 3 illustrates a further embodiment of a component in accordance with the invention.

FIGS. 2 and 3 illustrate two examples of a valve component which can be monitored in accordance with the invention. In both Figures, the valve 4 is provided of a form which can be provided in communication with the interior of the pipeline via the port 14. This port is open and allows the liquid passing along the pipeline, which is water in FIG. 2 and sewage in FIG. 3, to move into the valve body to the level 16 shown and in which, in both Figures, is the normal level at which the valves are provided in the closed condition. Suspended and floating in the liquid is a ball 18 provided in communication with an arm 20 which acts on a sealing face 22 which, in the condition shown, serves to seal off an air or gas orifice 24 as shown in FIG. 2 or an orifice 24 and exit 26 as is the case in FIG. 3.

Thus, when the ball float 18 is in the normal operating position then the valve is closed and no air or gas passes therethrough. However, if there is a change in condition in the pipeline then the position of the ball float 18 will change. If, for example, there is a pressure build up caused by air or gas build up or vacuum creation then the level 16 of the liquid in the valve will rise or lower in the direction of arrows 28 and 30 respectively, and depending on the form of the valve. This movement of the ball float will cause the orifice to open and the movement of gas or air through the valve in the required direction and so the valve is opened by movement of the arm 20.

It will be appreciated that if the ball float 18, arm 20 or sealing face jam or become blocked, so the movement of gas or air will not be possible and, in turn, the risk of a hazardous or damaging pressure build-up of gas or air in the pipeline will increase. It is therefore important that these valves operate correctly and, if they are not operating correctly, that the pipeline operator can be aware of this problem.

As such, in accordance with the invention in the embodiments of FIGS. 2 and 3 a listening device or hydrophone, and/or vibration detection device 32 is positioned on the body of the valve component 4 as shown. The hydrophone and/or vibration detection device is provided with sufficient sensitivity so as to be able to detect the sound and/or vibration made by the gas or air moving through the valve when the valve is open.

When this occurs, data representative of the noise and/or vibration heard can be stored in memory means at the location and/or made available to a remote location and in either case the data is collected by collection means 34 connected to the valve 4. Thus in accordance with the invention it is now possible for the operation of the valve to be monitored remotely and, if the valve does not operate, for that to be detected over a given time period.

In one embodiment the device in accordance with one embodiment of the invention consists of a vibration detector and associated data processing means to collect, process and record the vibration and time at which the vibration is detected. The housing of the device is non-intrusively positioned with respect to the valve to be monitored and may be located in the chamber in which the valve is located.

Wireless communication means, such as Bluetooth, RF or mobile phone, allows data to be transferred from the device without accessing the valve chamber and the data will include accurate timing of valve operations or inactive periods using an on-board real time clock. When installed, the monitoring device should be capable of being left in position for long periods, such as, for example, up to two years, a requirement which defines data storage, on-board analysis and battery life issues. The long term integrity of the equipment requires it to be water proof and, for operation on effluent pipelines, provide the appropriate level of intrinsic safety.

The data communication options include: to download the data on-site to a hand held computer using blue tooth technology for confirmation of valve operation. Alternatively, the data can be transferred via a mobile phone link. The apparatus may also include an external aerial to ensure wireless communication can be achieved. In one communication system RF (radio frequency) technology can be used to transmit the data from the chamber in which the valve and apparatus is located to a receiver positioned close by and from the receiver Bluetooth or mobile phone technology can be used to transfer the data locally or over long distances.

Figure 4:
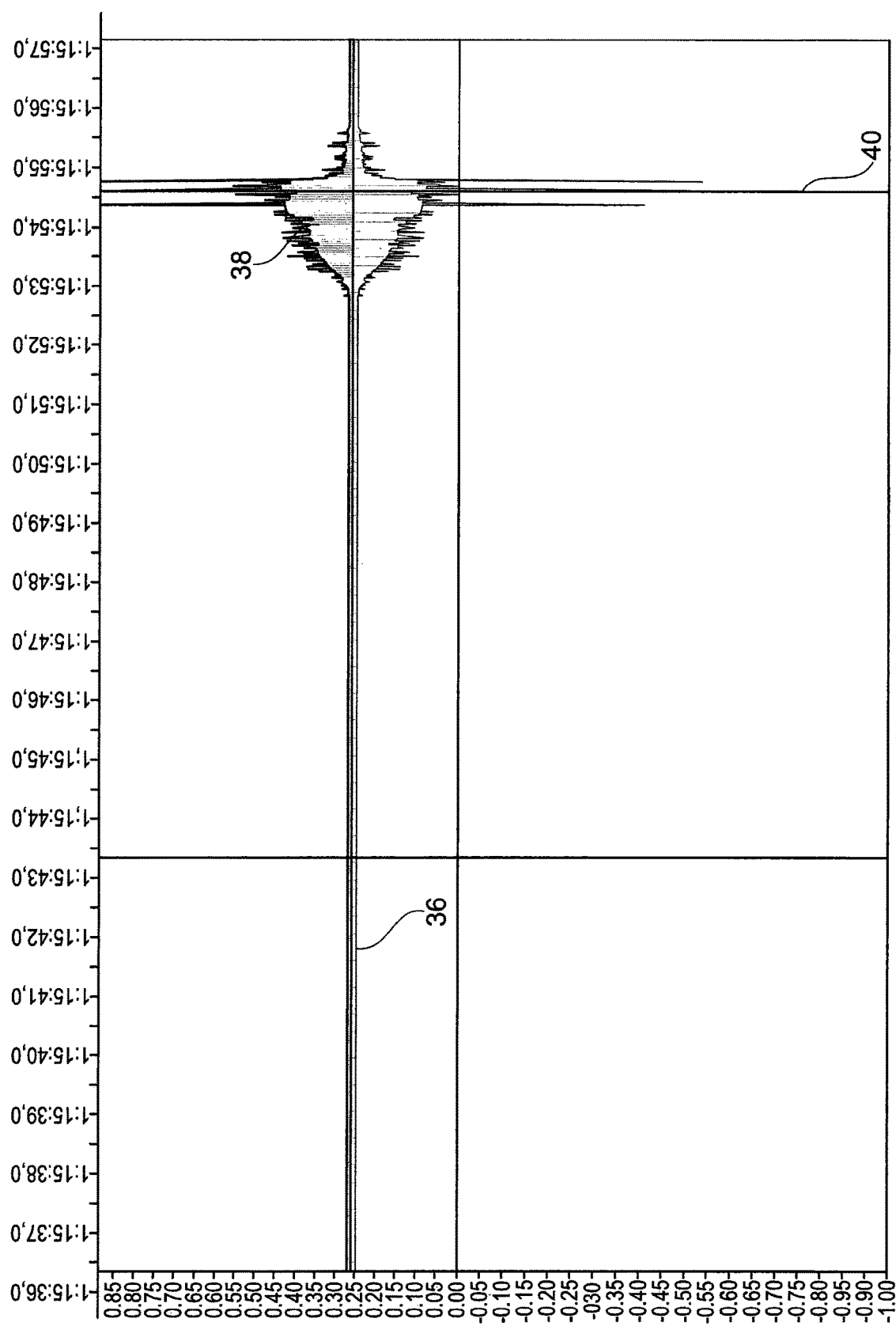
FIG. 4 illustrates an example of graphical results obtained in accordance with the invention.

FIG. 4 provides a graphical representation of the operation of a valve 4 to which the apparatus has been attached. In the graph, the relatively straight line portion 36 indicates the data which is collected over time represented by the x-axis when the valve is closed. However, when the valve is opened the data which is collected represents the significantly greater noise which is generated as is indicated by the graph portion 38 and this is interpreted as representing the noise made by the air escaping through the valve and so the operation of the valve can be accurately detected. Furthermore, in the embodiment shown, the noise made by the mechanical movement of the valve back to a closed position is also indicated by the portion 40 and so the movement of the valve back to the closed position can also be detected.

Figure 6:
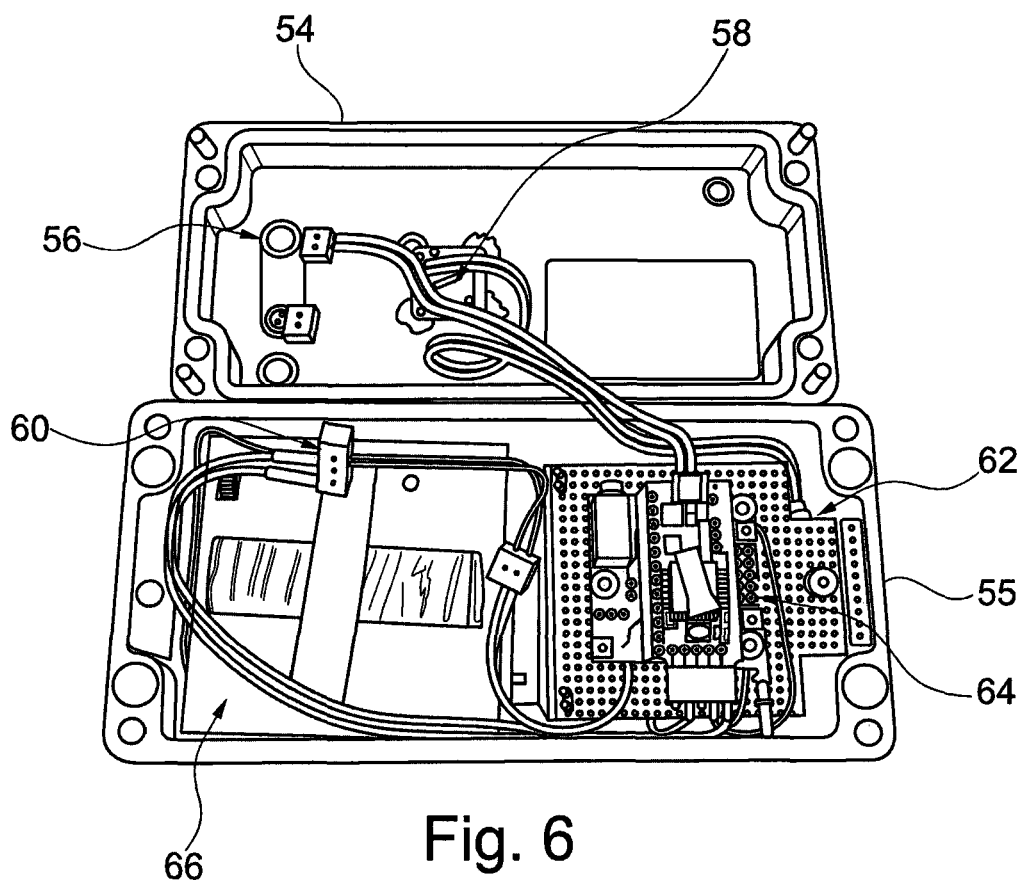
FIGS. 6 and 8 illustrate apparatus in accordance with one embodiment of the invention.
Figure 8:
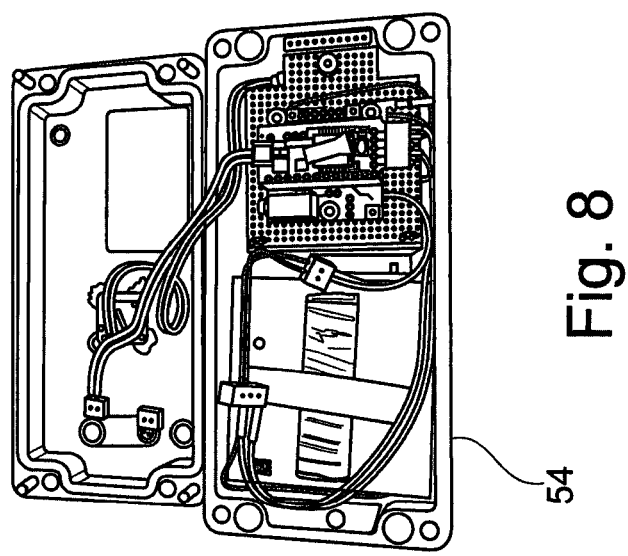

FIGS. 6 and 8 illustrate apparatus 54 in accordance with one embodiment of the invention. The apparatus includes a housing 55 which acts as an enclosure which is watertight, weatherproof and, when used on effluent pipelines, required to provide the appropriate level of intrinsic safety for the gaseous atmosphere. Within the housing 55 there is provided a vibration sensor 58. The apparatus is as a default provided in a sleep mode and the vibration sensor 58, when it detects vibration, causes the mode of operation of the apparatus to be changed from a sleep mode to an active mode. When in the sleep mode, the power usage is significantly less than when in the active mode and so the life of the batteries 66 within the housing is preserved when there is no change in condition of the component to be monitored and hence prolonging the period of time for which the apparatus can be used without charging the batteries of the apparatus.

Once in the active mode, ongoing detection of the condition change of the valve component to which the apparatus is fitted, is performed by at least one microphone 56, alone, or possibly in conjunction with the vibration detector 58. The data from the microphone and/or vibration detector is passed to respective data processing units 64, 62 mounted within the housing and this processes the data in conjunction with a timer which allocates the data to a time in the time period during which the apparatus is provided to monitor the component . The processed data is then stored in a memory media, if provided, and/or is passed to a means 60 for wireless communication of the data from the apparatus to a remote location via a suitable wireless communication means.

Figure 7:
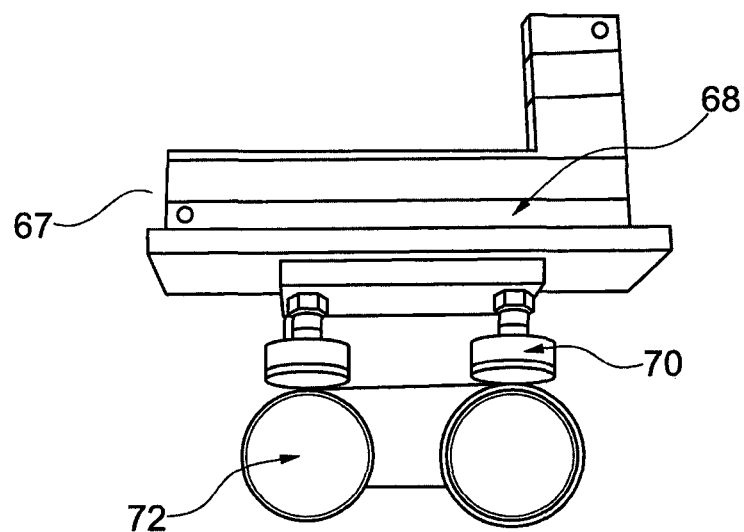
FIG. 7 illustrates one embodiment of attachment apparatus to attach the apparatus of FIGS. 6 and 8 to the component to be monitored.
Figure 9:
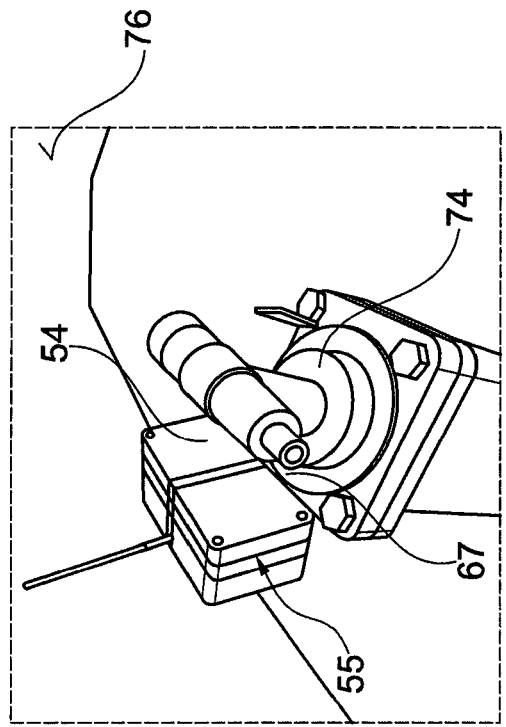
FIG. 9 illustrates the apparatus of FIGS. 6-8 in use to attach the apparatus to the component to be monitored.

FIG. 7 illustrates one form of attachment apparatus 67 which allows the apparatus housing 55 to be attached to the component which is to be monitored. The attachment apparatus includes a magnetic clamp 68 which is provided to be attached to the component such as an air valve. Also provided are further magnets 70, 72 which are mounted in perpendicular axes as shown and which are attached to the housing of the apparatus. This therefore ensures accurate location between the apparatus 54 and the component and ensures that the vibration detector 58 of the apparatus has a close connection with the component and is therefore able to detect vibration of the component being monitored. FIG. 9 illustrates the apparatus 54 mounted in position with an air valve component 74 via clamping means 67 in a position of use and it will be noted that the air valve is located in a pit or chamber 76. Alternative attachment apparatus can be used to suit other types of valves, such as, for example, valves with no metallic components.

FIGS. 10-12 illustrate a series of graphical representations which are developed from the noise (amplitude and frequency) data which is received from the apparatus with respect to the detected sound on the Y axis and with respect to time on the x axis. In FIGS. 10 and 12 there are illustrated the traces which would be expected to be obtained from different types of air vent operation when the same has been opened. It will be appreciated therefore that after initial monitoring, intelligence can be gathered in order to determine what is a "typical" trace which is generated when the valve component is operated. When this has been established, subsequent operations can be compared so that, for example, a trace which is inconsistent such as that shown in FIG. 11 is identified by, in this case comparing the same with the expected trace from the same location which is shown in FIG. 10.

FIG. 13 illustrates a series of log readings which can be obtained from the apparatus and which, as is shown, indicates the data file for each change in condition, the time and date at which it occurred and also further information can be added as to the reading itself.

Typically, the number of air valves that may be fitted to a pipeline, and the number of these that may not be working, it is considered that a prioritisation process for identifying valves to be investigated is required. The prioritisation could target individual pipelines and pipelines in a network to thereby optimise the selection of valves for monitoring and maintenance activities and ultimately reduce costs. It is suggested that the selection of 'critical' air valves to be monitored can be based on any or any combination of factors such as pipeline criticality, pipeline failure history, measured pipeline condition, calculated likelihood of fracture, and air valve location in the pipeline.

In one test, investigation into failures in a GRP pipeline indicated that the pipeline should have been capable of withstanding the applied loading. However, positive surge and vacuum pressures, due to inoperable air valves on the pipeline, were considered to have been a likely contributor to these failures. Ten air valves on the pipelines were examined and nine were found not to be operational, including two valves designed to allow air into the pipeline, as well as effluent gas out. Inspecting these valves for operability would conventionally require some level of strip down, and waiting for the valves to flow gas or air is not practical because the period between which they operate varies and is unknown.

Thus the opportunity to develop and apply automatic monitoring of these valves was identified, based on monitoring for vibration and sound and recording of their operation. The technique offers significant financial savings by both ensuring pipeline loading is within expected levels, reducing the costs of accessing valves to check their operability, and minimising pumping costs related to the presence of air or gas pockets in pipelines.

Tests on air valves using the current invention apparatus show that the valve operation produces identifiable noise and/or vibration patterns from the valve mechanism, and/or from the gas or air exiting (or entering) through the valve.

Figure 5:
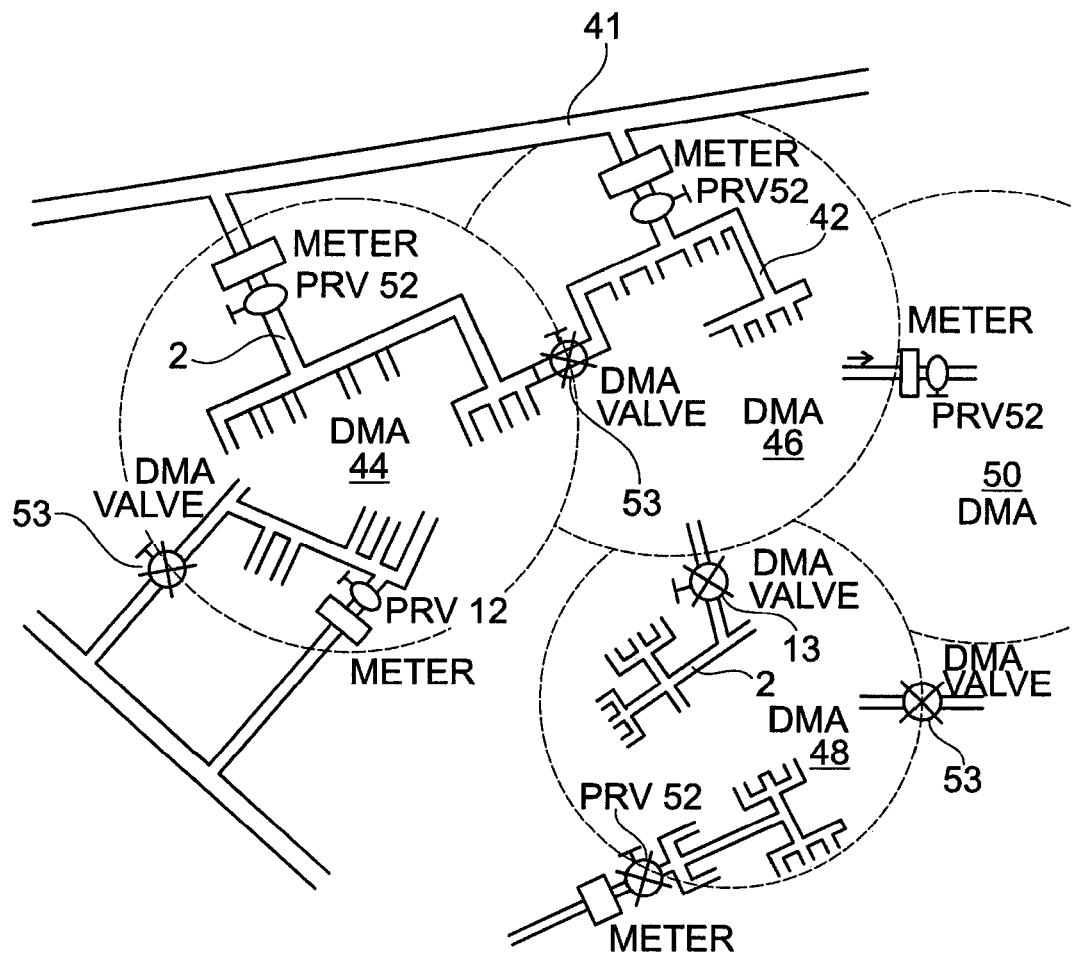
FIG. 5 illustrates a water distribution network with components to be monitored in accordance with one embodiment of the invention.

A further embodiment of the invention is described with reference to FIG. 5 which illustrates part of a water distribution network which comprises a number of interlinked pipelines 42 from a trunk main 41, each provided to carry water therealong to a number of end users. The network is split into a number of District Meter Areas (DMA's) 44, 46, 48, 50 and the water entering each DMA and leaving each DMA can be measured and matched in order to identify any leakage or unauthorised use.

At the entry to each DMA there is provided at least one valve, and often several valves 52 which control the water entering the DMA. Each of these valves 52, when open, allow the flow of water into the DMA through a meter, to record the volume of water passing through the same. Thus the total volume of water entering each DMA is recorded.

To facilitate the passing of water between DMA's when operationally required, the DMA's are fitted with connecting pipelines with, normally closed, DMA valves 53 fitted to the same.

In accordance with this embodiment of the invention monitoring apparatus is provided to be used at each of the valves 53, permanently or temporarily, in order to detect the noise which is caused by the passage of water through the valve and, if the same is detected, then action can be taken to visit the valve and replace the same, if it has failed, or move the same to closed position.

The present invention therefore provides the means to allow an open or partially open valve to be detected and monitored over time and thereby ensure that, if required, steps can be taken to move the valve to the required condition or effecting repairs to the valve. Furthermore, by ensuring that the valve is operating correctly, so the monitoring of the usage of material passing along the pipeline, such as water, and within certain parts of the distribution network can be assessed more accurately. The present invention therefore provides the means to allow the operation of a gas or air valve to be detected and monitored over time and thereby ensure that the integrity and safety of the pipeline can be monitored and maintained. Furthermore, by ensuring that the valve is operating correctly, so other predictions which may be made as to the condition of the pipeline can also be more accurately made given that a more accurate indication of the operating characteristics of the pipeline can be determined.

The invention claimed is:

1. Apparatus for the monitoring of a condition of a valve component fitted to, and operable in communication with, a pipeline which is provided to carry fluid including water or effluent liquid therealong, said apparatus comprising:
   a dormant mode in which vibration is monitored and an active mode in which vibration, noise, or vibration and noise is monitored;
   at least first and second detecting devices, the first detecting device having a lower power mode and a higher power mode, and the second detecting device having a deactivated mode and an activated mode, the first and second devices being fitted in a substantially watertight housing located on, or adjacent to, the valve component;
   the first detecting device having sensing means for monitoring vibration and for detecting a vibrational change in the valve component,
   the second detecting device having an acoustic sensor configured to detect and store noise created by at least one of a member of the group consisting of: the valve component, liquid, air and gas;
   processing means for determining whether the noise detected by the second detecting device signifies operation of the valve component between closed and open position and whether a pressure level of the fluid has reached a predetermined level of pressure at a location of the valve component;
   wherein when apparatus is in the dormant mode, the first detecting device monitors the vibration and the second detection device is not monitoring the noise;
   wherein when apparatus is in the dormant mode and the first detecting device detects the vibration, the apparatus changes to the active mode and the second detecting device monitors the noise;
   wherein when the apparatus is in the active mode a continuous transmission of data of detected noise is sent to the processing means; and wherein, power usage of the apparatus is less in the dormant mode than in the active mode.

2. Apparatus according to claim 1 wherein the second detecting device is a microphone or hydrophone.

3. Apparatus according to claim 1 wherein when vibration is detected by the first detecting device, the processing means in the housing switches the apparatus from the dormant mode to the active mode to detect the noise with the second detecting device.

4. Apparatus according to claim 1 wherein when the apparatus is in the active mode, the first and second devices transmit and store data relating to the detected vibration and/or noise and then the apparatus deactivates after a period of time, thereby allowing conservation of battery power required to operate the first and/or second devices.

5. Apparatus according to claim 1 wherein the apparatus includes a memory means for storing data indicative of change and/or no change with respect to time of a condition of the valve component on which the apparatus is located.

6. Apparatus according to claim 5 wherein the storage of the data is performed at a location of the apparatus and then retrieved remotely, and assessed to determine the operation, or otherwise of the valve component.

7. Apparatus according to claim 1 wherein if a change in condition is not detected within a given time period then a signal is transmitted to a monitoring location and/or is generated at the location of the apparatus.

8. Apparatus according to claim 1 wherein the apparatus includes one or more power cells to provide power to operate the first and second detection devices and processing means.

9. Apparatus according to claim 1 wherein the apparatus housing also has located therein one or more power cells, control circuitry and data transmission means.

10. Apparatus according to claim 1 including attachment means for retaining the apparatus on the valve component.

11. Apparatus according to claim 10 wherein the attachment means include one or more magnets which connects the apparatus housing to the valve component to be monitored.

12. Apparatus according to claim 1 wherein the second detecting device is provided in conjunction with the valve component being monitored for a period of time, and data received from the second detecting device is stored on a storage media, the received data is subsequently analysed to ascertain whether noise data detected from the second device is indicative of a correct operation of the component.

13. Apparatus according to claim 12 wherein the analysis of the received data is performed automatically by the processing means upon receipt of said received data.

14. Apparatus according to claim 13 wherein if the apparatus is not moved to an active mode within a given time period the processing means indicate a non-operation of the valve component.

15. Apparatus according to claim 1 wherein the apparatus is provided in conjunction with the valve component and pipeline on a permanent basis and the data is transmitted to the processing means.

16. Apparatus according to claim 1 wherein the valve component is an isolation valve fitted to pipework of a district meter area network.

17. Apparatus according to claim 1 wherein the apparatus is provided in direct contact with the liquid passing along the pipeline.

18. A method for the monitoring of the condition of a valve component fitted to, and operable in communication with, a pipeline which is provided to carry water or effluent liquid there along said method comprising the steps of:

locating an apparatus having a substantially watertight housing on, or adjacent to, the valve component, the apparatus having a dormant mode in which vibration is monitored and an active mode in which vibration, noise, or vibration and noise is monitored;

providing in the housing a first detecting device and a second detecting device having a deactivated mode and an activated mode; the first detecting device having a vibration sensor for detecting a vibrational change in the valve component, the second detecting device having an acoustic sensor for detecting noise created by at least one of a member of the group consisting of: the valve component, liquid, air, and gas;

monitoring, by the first detecting device, for a vibrational change in the valve component while the second detecting device is in the deactivated mode, the apparatus using less power while monitoring for a vibrational change than while in the active mode;

detecting, by the first detecting device, a vibrational change of the valve component:

upon detecting the vibrational change of the valve component, moving the second detecting device from the deactivated mode to the activated mode;

detecting, by the second detecting device, noise created by at least one of a member of the group consisting of: the valve component, liquid, air and gas;

processing stored data representative of the detected vibration and the detected noise to determine operation of the valve component between closed and open positions; and maintaining a continuous monitoring operation when the apparatus is in the active mode by the second detecting device continuously transmitting data of a pressure level of fluid within the pipeline reaching a predetermined level at the location of the valve component.

19. A method according to claim 18 wherein the change in condition of the valve component is achieved by mechanical operation of the valve.

20. A method according to claim 19 wherein noise detected by the said second detecting device is created by a member selected from the group consisting of flow of liquid, air and gas through the valve and/or by the detection of the mechanical operation of the valve component.

21. A method according to claim 18 wherein after a predetermined period of time during which no noise and/or vibration is detected the apparatus returns to the dormant mode.

22. A method according to claim 18 wherein in active mode, the apparatus transmits or stores data relating to the detected vibration and/or noise and then deactivates after a period of time, thereby allowing conservation of battery power required to operate the apparatus.

23. A method according to claim 18 wherein data for the noise and/or vibration and time at which the noise and/or vibration was detected is stored in a memory means provided in the housing.

24. A method according to claim 23 wherein data is retrieved from the memory means and assessed to determine the operation, or otherwise of the component.

25. A method according to claim 18 wherein if a change in condition is not detected within a given time period, an alert signal is transmitted to a monitoring location and/or is generated at the location of the valve component.

26. A method according to claim 18 wherein the method includes the step of attaching the housing on the valve component using attachment means.

\* \* \* \* \*